(12) United States Patent
Bush et al.

(10) Patent No.: US 7,583,417 B2
(45) Date of Patent: Sep. 1, 2009

(54) BI-DIRECTIONAL SCANNING AND IMAGING WITH SCANNING COMPENSATION

(75) Inventors: Craig Palmer Bush, Lexington, KY (US); Roger Steven Cannon, Nicholasville, KY (US); Martin Christopher Klement, Lexington, KY (US); Daniel Eugene Pawley, Louisville, KY (US)

(73) Assignee: Lexmark International, Inc., Lexington, KY (US)

( * ) Notice: Subject to any disclaimer, the term of this patent is extended or adjusted under 35 U.S.C. 154(b) by 942 days.

(21) Appl. No.: 10/947,029

(22) Filed: Sep. 22, 2004

(65) Prior Publication Data

US 2006/0064019 A1 Mar. 23, 2006

(51) Int. Cl.
*H04N 1/04* (2006.01)

(52) U.S. Cl. .................. 358/474; 358/1.2; 358/1.9; 358/514; 382/255; 382/274; 348/208.11; 348/201; 348/68; 359/204; 250/235; 347/259

(58) Field of Classification Search .............. 358/474, 358/497, 509, 475, 486, 513, 514, 505, 516, 358/520, 468, 1.7, 1.1, 1.2, 1.9; 250/208.1, 250/235; 347/259, 243, 225; 359/204, 216–219, 359/199, 213; 348/68, 208.1; 382/274, 275, 382/318, 255
See application file for complete search history.

(56) References Cited

U.S. PATENT DOCUMENTS

| | | | | |
|---|---|---|---|---|
| 6,429,956 B2 * | 8/2002 | Itabashi | ................... | 359/204 |
| 6,522,860 B2 * | 2/2003 | Nose et al. | ................... | 399/374 |
| 6,760,121 B1 * | 7/2004 | Kimura et al. | ............... | 358/1.7 |
| 6,870,560 B2 * | 3/2005 | Bush et al. | .................. | 347/259 |
| 6,937,372 B2 * | 8/2005 | Kandori et al. | .......... | 359/198.1 |
| 6,956,597 B2 * | 10/2005 | Bush et al. | .................. | 347/243 |
| 7,064,879 B1 * | 6/2006 | Levitan et al. | ........... | 359/224.1 |
| 7,095,488 B2 * | 8/2006 | Jamieson et al. | .......... | 356/5.01 |
| 7,105,847 B2 * | 9/2006 | Oka | ..................... | 250/559.33 |
| 7,321,379 B2 * | 1/2008 | Cannon et al. | ............. | 347/243 |
| 2003/0021497 A1 * | 1/2003 | Kandori et al. | ............. | 382/323 |

* cited by examiner

*Primary Examiner*—Negussie Worku

(57) ABSTRACT

In bi-directional imaging, such as bi-directional printing, a driving mechanism scans a light beam through a scan path across an imaging window. A controller enables transmission of video data to a modulator when the light beam is positioned for imaging on the imaging window. Video data is transmitted to the modulator when the light beam is traveling in a forward direction or a reverse direction across the imaging window, whereby a modulated light beam is capable of producing an image when traveling in the forward or reverse directions. The controller adjusts scan durations or image rasterization rates to ensure that each scan is properly aligned with the prior and subsequent scan.

22 Claims, 14 Drawing Sheets

BI-DIRECTIONAL SCANNING AND IMAGING WITH SCANNING COMPENSATION

FIELD OF THE INVENTION

The present invention relates to bi-directional scanning and imaging devices and methods, and particularly relates to bidirectional printing utilizing corrective techniques to ensure proper scan-to-scan alignment.

BACKGROUND OF THE INVENTION

Typically in laser printing devices, a scanning polygonal mirror is used for the purpose of scanning a light beam across a latent image storage device such as a photoconductor. High precision scanning devices employing mirrors remain dominant in the field primarily because of problems with other technologies. Resonant torsion oscillators are known, but are not typically employed in devices utilizing optical systems such as laser printing devices. In the case of scanning devices using galvanometric oscillators, the problems include relatively low scan efficiency, relatively high laser modulation frequencies, scan speed instability, scan amplitude instability, and resonant frequency instability associated with environment.

One particular problem in conventional scanning devices is controlling the alignment of vertically adjacent scans. When scan duration in a first direction differs from scan duration in a second direction, image width varies to some degree and the accuracy of a desired image is diminished. Since increasingly higher resolution images are in demand by consumers and various industries, there exists a need for a more accurate bi-directional imaging apparatus and method for ensuring more accurate imaging.

SUMMARY OF THE INVENTION

The present invention addresses this problem by providing scanners and scanning methods that are capable of operating in many challenging image scanning environments, including that of a resonant oscillator, yet provide for scanning operations with superior scan-to-scan alignment. For a bidirectional scanner or scan method, the term "scan-to-scan" alignment refers to the scan timing or image placement across an imaging window in a forward direction as it relates to the scan timing or image placement in a reverse direction. If the scan timing or image placement in the forward direction is different from the scan timing or image placement in the reverse direction, any image generated in the imaging window that requires more than a single directional scan will be less accurate because the scan timing or image placement must be substantially equal in both the forward and reverse directions in order to more precisely generate a desired image.

In accordance with one embodiment of the invention, a bidirectional imaging apparatus includes a light source generating a light beam oscillated in a scanning motion for imaging purposes such as printing. In a preferred embodiment, the scanning motion is created by a galvanometric oscillator having a reflective surface disposed in the path of the light beam. The oscillator oscillates and scans the light beam through a scan path including an imaging window occupying a portion of the scan path, and the light beam is scanned across the imaging window in a forward direction and a reverse direction. The motion of the oscillator and the light beam is governed by control logic. The control is logic is capable of locating an imaging window in both scan directions and determining the duration of each individual directional scan. When the light beam is properly positioned for imaging, the control logic transmits a signal for the modulator to begin modulating the light beam. The control logic uses the duration information detected during each scan to alter drive signals to the scanning device. The drive signals ultimately determine the rate at which the scanning device scans in a given direction. The drive signals are continuously controlled to produce forward and reverse scan durations that are substantially equal.

In an alternative embodiment, the control logic controls an image signal to the modulator, determining the rasterization rate—the rate at which images are projected onto the imaging window—and achieving proper scan-to-scan alignment. In this embodiment, first and second clocks, each programmed and controlled by the control logic, are used to send first and second clock signals to an image rasterization logic block. The image rasterization logic block receives the image signal and rasterizes the signal based on either the first or second clock signal. The first clock and first clock signal correspond to scanning in the forward direction and the second clock and second clock signal correspond to scanning in the reverse direction.

In another embodiment, the image rasterization logic block contains first and second image rasterization logic sub-blocks. In this embodiment, the first image rasterization logic sub-block rasterizes the incoming image signal based on the first clock signal and the second image rasterization logic sub-block rasterizes the incoming image signal based on the second clock signal. The image rasterization logic sub-blocks generate first and second rasterized pre-signals, respectively. The control logic then selects the first rasterized pre-signal as the rasterized signal when the scanner is scanning in the forward direction, and the control logic selects the second rasterized pre-signal as the rasterized signal when the scanner is scanning in the reverse direction. The rasterized signal, once selected, is sent to the modulator that modulates the light beam and an image is developed in the imaging window.

BRIEF DESCRIPTION OF THE DRAWINGS.

Details of exemplary embodiments of the invention will be described in connection with the accompanying drawings, in which.

DETAILED DESCRIPTION OF THE PREFERRED EMBODIMENTS

Figure 1:
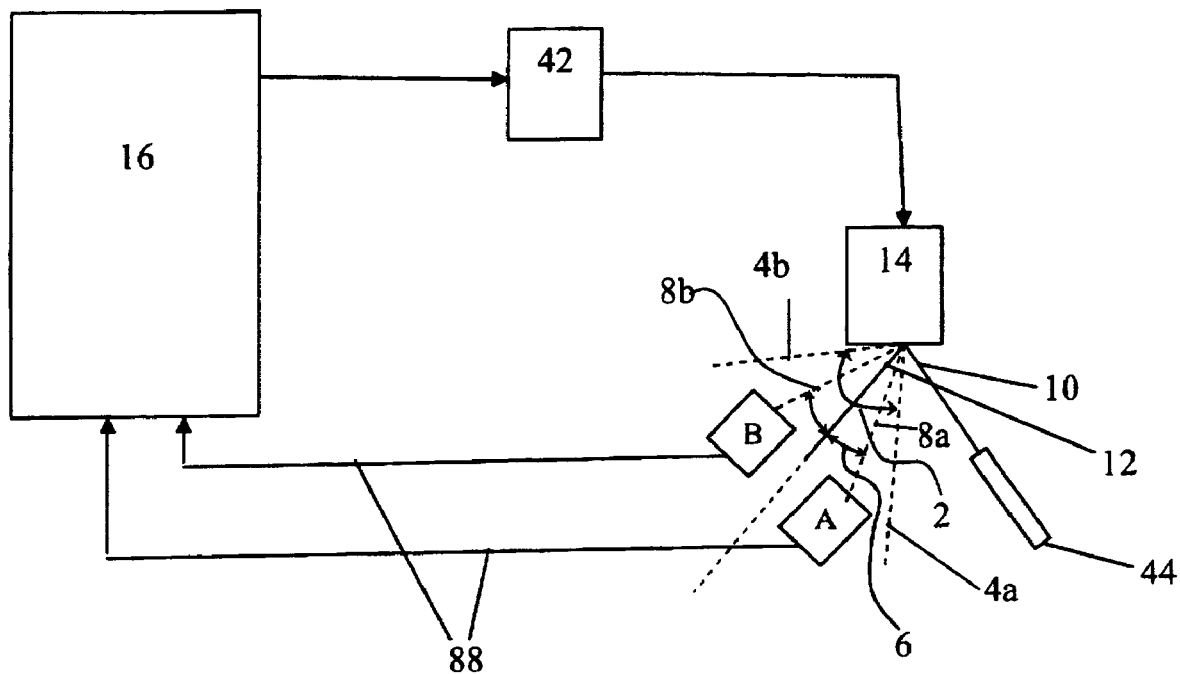
FIG. 1 is a schematic illustration of a light beam scanning and detection system of one embodiment of the invention.

As schematically illustrated in FIG. 1, a preferred embodiment of the present invention includes a light source such as light beam generator and modulator 44 which generates a light beam 10. The "light beam generator and modulator 44" are shown in FIG. 1 and described hereafter as one device. The light beam 10 is oriented to illuminate a driving mechanism 14 such as a torsion oscillator and the light beam 12 is scanned through a scan path 2, including an imaging window 6 which occupies a portion of the scan path 2. In a preferred embodiment, the light beam 10 is in the form of a laser. As shown in FIG. 1, the scan path 2 is shown as the range from the dotted line 4a to the dotted line 4b. The imaging window 6 is the range between the dotted line 8a and the dotted line 8b.

Before the light beam 10 is sent to the driving mechanism 14, the light beam 10 is modulated by the light beam generator and modulation apparatus 44, based in part on incoming sensor signals or position signals generated from one or more sensors placed along the scan path (shown as block A and B) as forward and reverse scans proceed across the imaging window 6. The sensor signals or position signals are sent to control logic 16, and a number of determinations are made. For example, the control logic 16 may determine when the light beam 12 has entered and exited the imaging window 6, the duration of each forward and reverse scan across the imaging window 6, and whether scans are proceeding in the forward or reverse direction.

Figure 2:
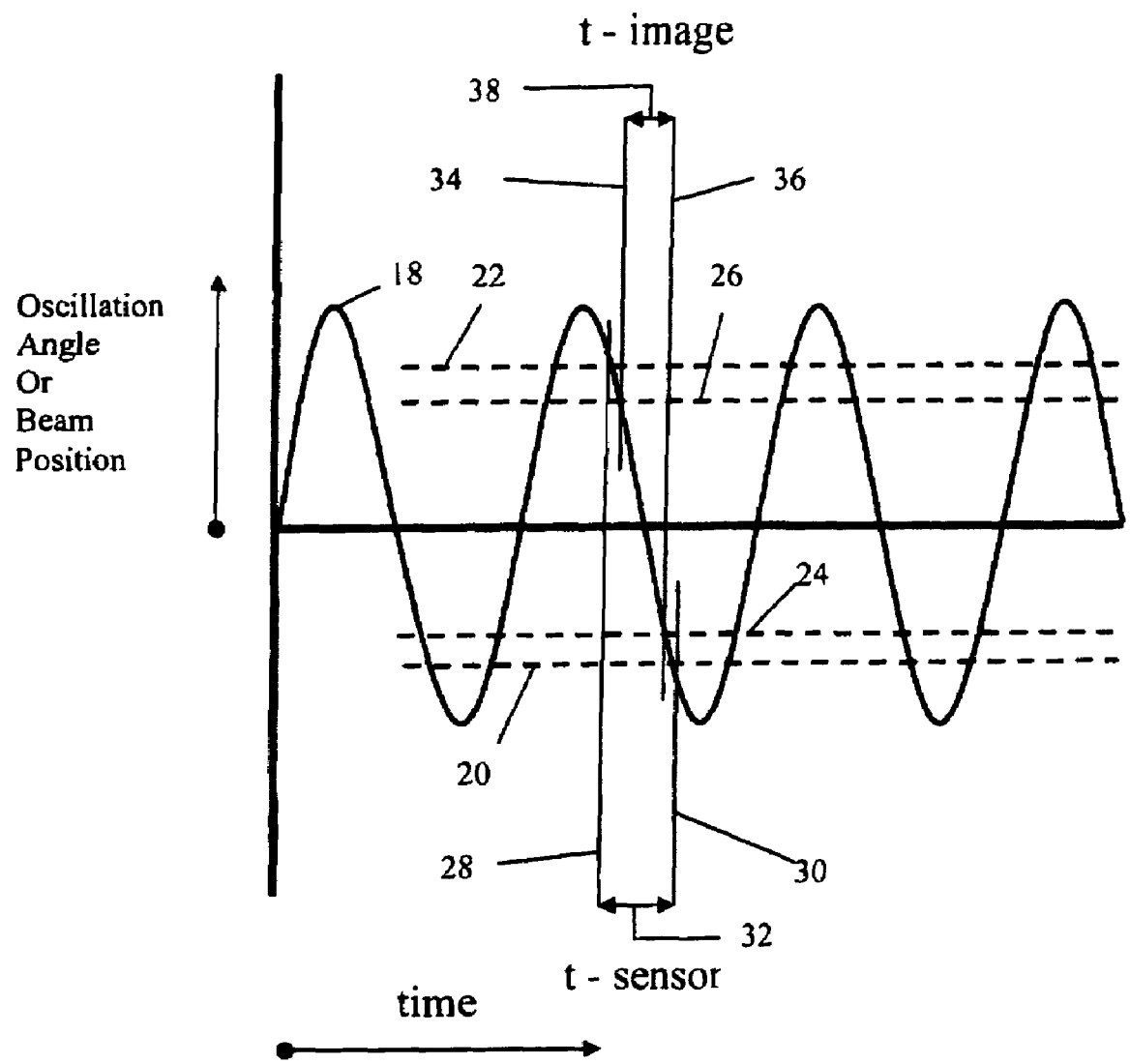
FIG. 2 is a graph of a light beam scan with sensors disposed adjacent either side of an imaging window (also referred to as a "zone")

One way to determine the time required for the light beam 12 to scan across the imaging window 6 is to use a pair of sensors disposed adjacent opposite sides of the imaging window 6 at a fixed distance from the imaging window 6. FIG. 2 graphically illustrates a light beam scan with a pair of sensors disposed adjacent either side of an imaging window 6. In FIG. 2, curve 18 represents the light beam scan with the X axis representing time and the Y axis representing amplitude. Dashed line 20 represents the position of one optical sensor relative to the light beam scan represented by curve 18 and, likewise, dashed line 22 represents the position of the other sensor. Dashed lines 24 and 26 represent the opposite sides of the imaging window, and the distance between lines 24 and 26 represents the amplitude or size of the imaging window. The sensors represented by lines 20 and 22 are positioned adjacent to, and on opposite sides of, the imaging window represented by lines 24 and 26. As the light beam sweeps across the sensors at lines 20 and 22, each sensor generates a signal and the time difference between the two sensor signals is the time required for the light beam to sweep from one sensor to the other. In FIG. 2, lines 28 and 30 indicate the time at which the light beam scan of curve 18 is swept across the sensors indicated by lines 20 and 22. The arrow 32 indicates the time required for the light beam to scan from one sensor to the other, which is referenced as "t-sensor" in FIG. 2. Lines 34 and 36 indicate the times at which the laser scan of curve 18 crosses the edges of the imaging window defined by lines 24 and 26. The arrow 38 represents the time for the light beam to scan across the imaging window of lines 24 and 26, which is referenced as "t-image" in FIG. 2.

The distance between the sensors represented by lines 20 and 22 and the edges of the imaging window represented by lines 24 and 26 is known and is preferably small. Thus, the time difference between t-sensor and t-image may be calculated or approximated. Likewise, the time delay between the light beam striking the sensor and the light beam crossing an edge of the imaging window may be calculated or approximated.

In one application the imaging window 6 is centered generally in the middle of the scan path 2 and is typically, about 8.5 inches in width, but the imaging window 6 could be off-center relative to the light beam sweep, but within the light beam sweep. Likewise, the imaging window 6 could be greater or smaller than 8.5 inches depending upon the particular application. The apparatus to control the operation of this invention (the control logic) 16 may include electronic control, such as a microprocessor or combinational logic in the form of an Application Specific Integrated Circuit (commonly termed an ASIC).

Figure 3:
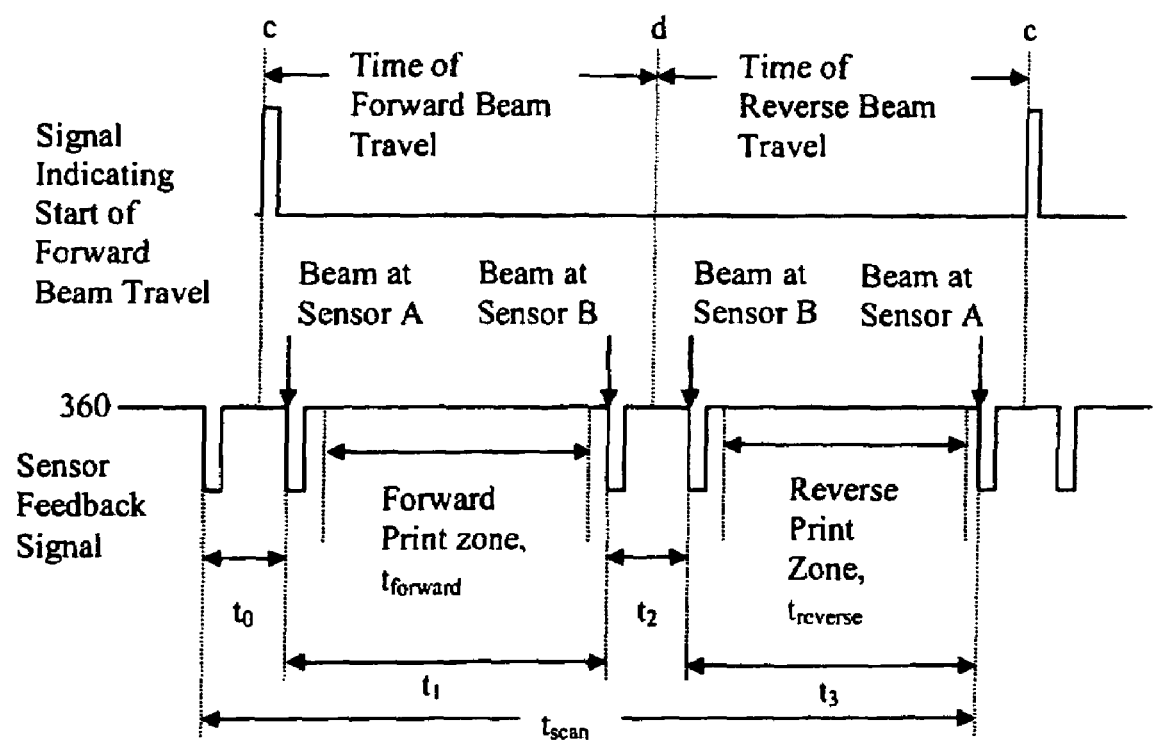
FIG. 3 illustrates a sensor feedback signal generated by sensors placed within the scanning path of the light beam of FIG. 5.
Figure 4:
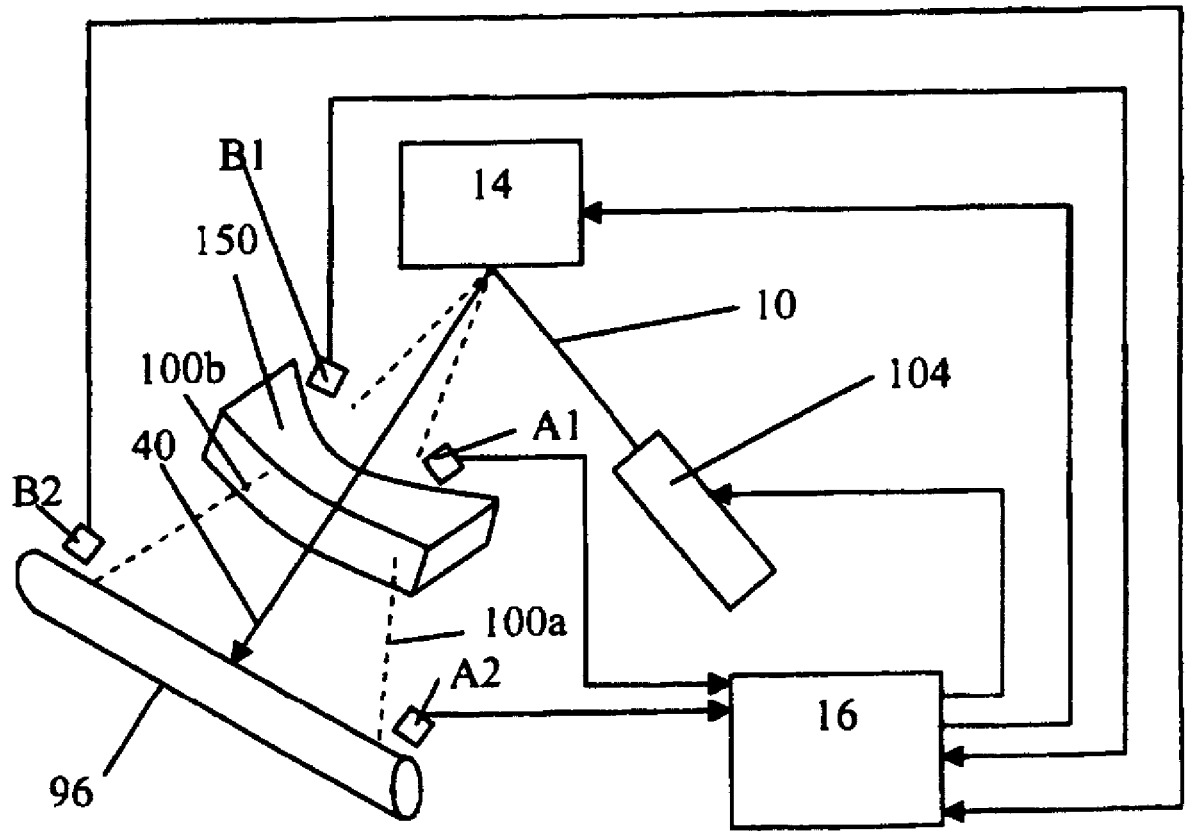
FIG. 4 is a schematic diagram of an imaging system illustrating an alternate embodiment of this invention.
Figure 5:
FIG. 5 schematically illustrates the forward and reverse scan paths of a scanning light beam.
Figure 13:
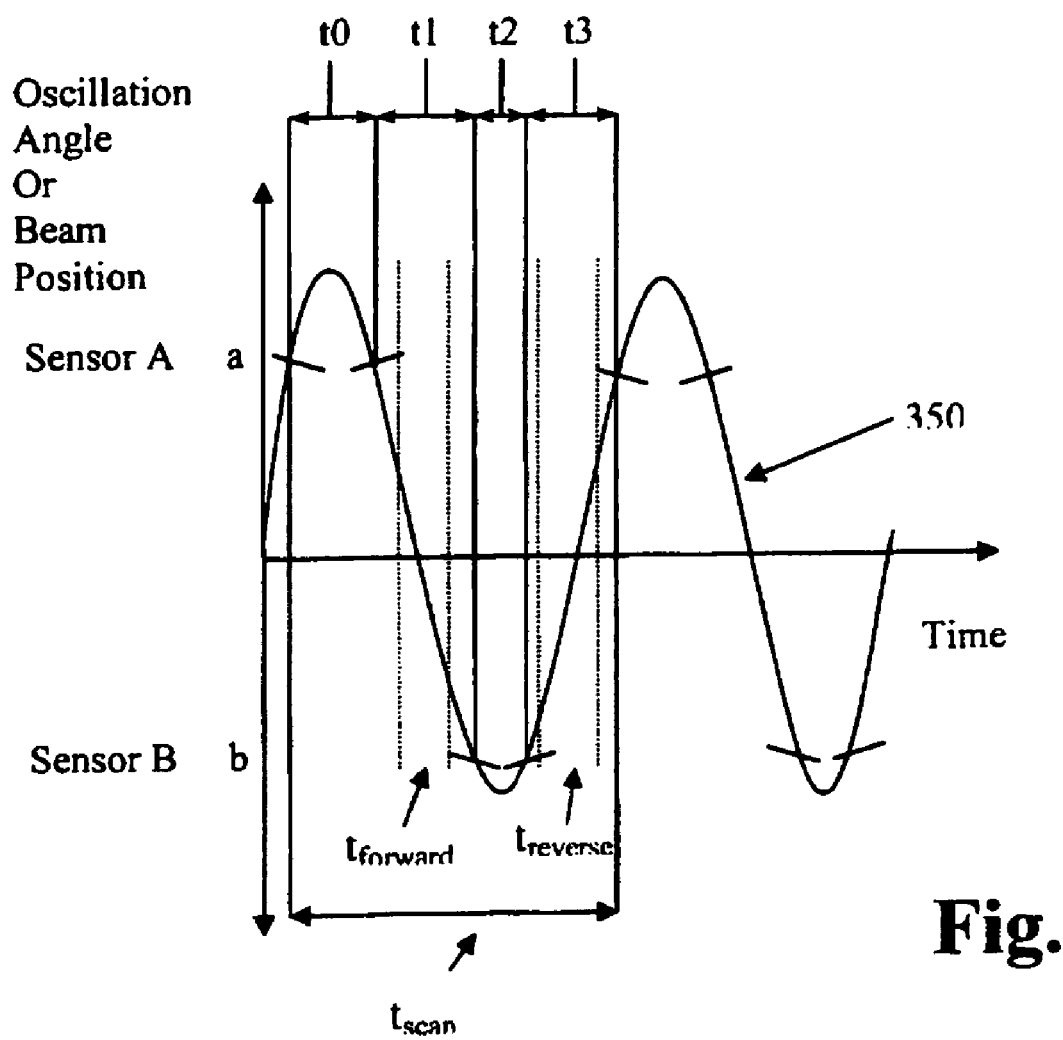
FIG. 13 is a graph that illustrates scan angle versus time for a torsion oscillator used in a bi-directional scanning system.

The operation of one embodiment, a bi-directional laser printer, is illustrated in FIGS. 3 and 13. FIG. 3 illustrates the combined sensor feedback signals from sensors A and B as a function of time. In a preferred embodiment, either sensor A or B or both comprise a photodiode that is biased up in voltage. Preferably, the biased voltage (V-reference) is +5V or +3.3V. FIGS. 4 and 5 show an embodiment of the device through which this operation is performed. The sensors a and b in FIG. 5 represent either A1 and B1 or sensors A2 and B2 in FIG. 4. When the reflected light beam 40 travels over either sensor a or b, the voltage output of the sensor drops toward zero as shown in FIG. 3. In an alternative embodiment wherein sensor b comprises a mirror, the reflected light beam 40 is reflected by the mirror at location b to the sensor a and the voltage output of sensor a drops toward zero. Alternatively, sensor a could comprise a mirror while sensor b comprises another type of sensor such as a photodiode.

Figure 6:
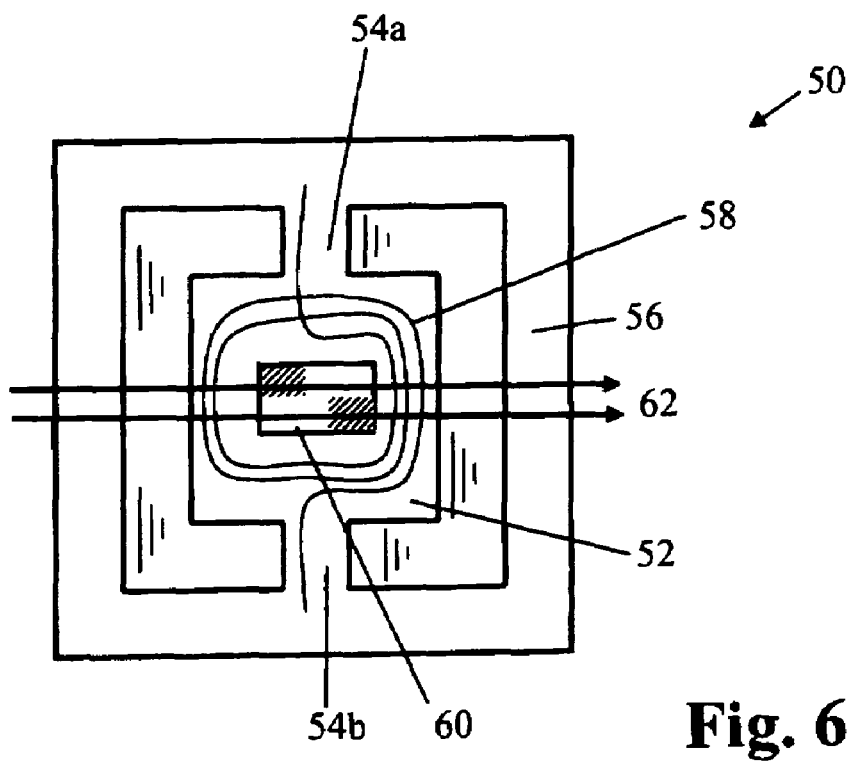
FIG. 6 is a somewhat schematic plan view of a representative torsion oscillator that may be used in one embodiment of the invention.

A signal indicating the start of forward beam travel (from point c toward point d in FIG. 5) is shown at the top of FIG. 3. The signal indicating the start of forward beam travel is preferably generated from the electrical drive signal to the coils 58 of the torsion oscillator 50, 64 or 70 as shown in FIGS. 6, 7, and 8, respectively. When a forward electrical drive signal is sent to the coils 58, a signal is generated indicating the start of forward beam travel. Likewise, when a reverse electrical drive signal is sent to coils 58, a reverse drive signal is or may be created to indicate the start of reverse beam travel. In another embodiment, when two sensors a and b are used, direction of travel may be determined by the order of the signals from the two sensors, where a to b is one direction and b to a is the other.

Figure 12:
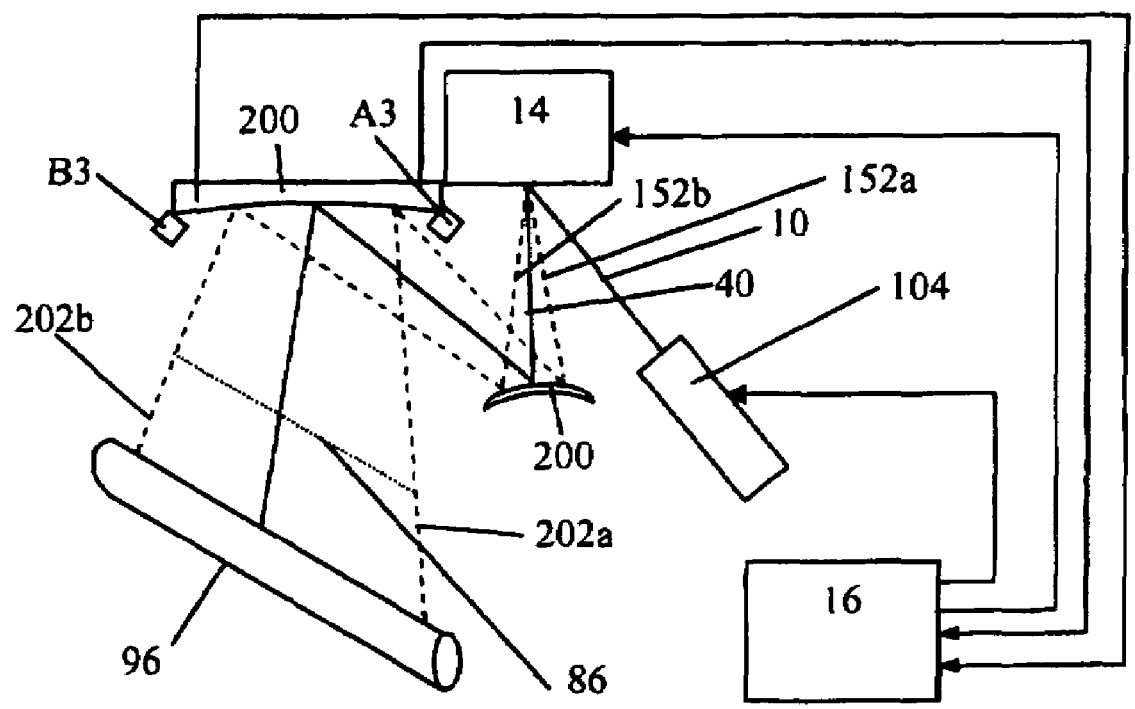
FIG. 12 is a schematic diagram of another imaging system representing yet another embodiment of the invention.

As shown in FIG. 4, the control logic 16 is connected to one or more sensors (shown as A1, A2, B1, and B2) used to determine the position of the light beam 40 in the scan path at a specific point in time. The one or more sensors and the data communicated therefrom allow the control logic 16 to control the modulation of the light beam 40 based on forward and reverse scan duration. Examples of optical configurations are shown in both FIGS. 4 and 12. FIG. 4 depicts an optical configuration having a lens 150 that is used to modify the reflected light beam 40 as it oscillates between positions indicated by beams 152a and 152b. FIG. 12 shows an optical configuration of mirrors 200 used to multiply reflect the scanned light beam 40. The extremes of the path of light beam 40 are shown by dashed lines 202a and 202b. The optic configurations in FIGS. 4 and 12 are illustrative and should not be considered limiting. Numerous other optic configurations utilizing lenses, mirrors, or both are possible.

The preferred means of scanning includes a torsion oscillator. The torsion oscillator 50 of FIG. 6 includes a central generally rectangular plate 52 suspended by two extensions 54a, 54b of the material of plate 52. The plate 52 is generally symmetrical about its axis of oscillation. Extensions 54a, 54b are integral with a surrounding frame 56. Typically, the plate 52, extensions 54a, 54b and frame 56 are cut or etched from a single silicon wafer. A coil 58 of conductive wire and a mirror 60 or similar reflective surface are placed on the central plate. The mirror may be a smooth or polished surface on the silicon plate 52, since silicon itself is about sixty percent reflective. Typically the mirror is a deposited layer of gold (or other material) on the smooth silicon substrate. Since the reflectivity of the silicon is wavelength dependent (falling off rapidly about 1 micron wavelength), a deposited mirror is typically used, or the raw silicon can be used without a mirror when system efficiencies allow. A 60% reflection would be suitable for some applications.

This entire assembly is located inside a magnetic field 62 (shown illustratively by lines with arrows), such as from opposing permanent magnets (not shown in FIG. 6). When a current passes through coil 58, a force is exerted on coil 58 that is translated to plate 52 since coil 58 is attached to plate 52. This force causes rotation of plate 52 around extensions 54a, 54b that twist with reverse inherent torsion. This "force" is the drive force discussed previously. The drive force can be in one of two directions depending on which direction an electric current travels through coil 58. Plate 52 can rotate in one of two directions. The direction of magnetic field 62 in FIG. 5 is illustrative of one of the two potential directions that plate 52 can be rotated. If the light beam 10 is directed to plate 52 while a drive force is acting on the torsion oscillator 50 (i.e., when a substantial current is traveling through coil 58), the resultant rotations caused by the drive forces will also result in scanning the light beam 12 in a forward or reverse direction across the scan path 2. Therefore, the drive force that results in forward directional scanning is defined as a forward drive force and the drive force that results in reverse directional scanning is defined as a reverse drive force.

Figure 7A:
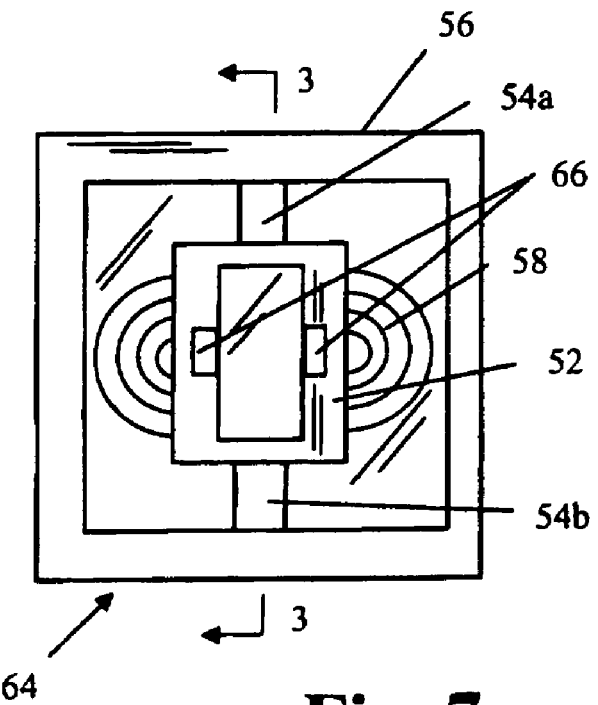
FIG. 7a is a somewhat diagrammatic top or plan view of one torsion oscillator that may be used in embodiments of the invention.
Figure 7B:
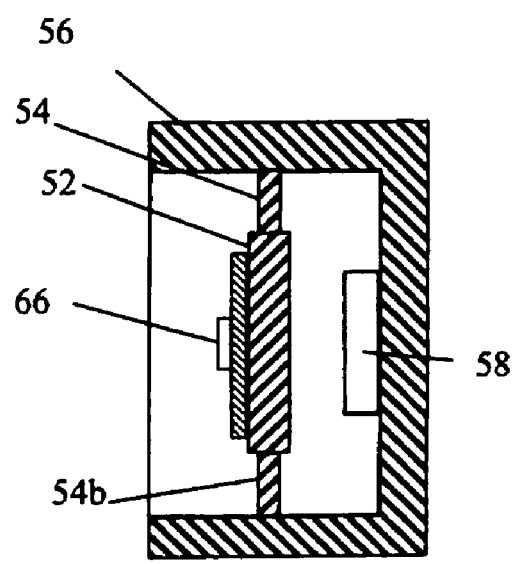
FIG. 7b is a cross sectional view of the torsion oscillator of FIG. 2 taken along line 3-3 in FIG. 2.
Figure 7C:
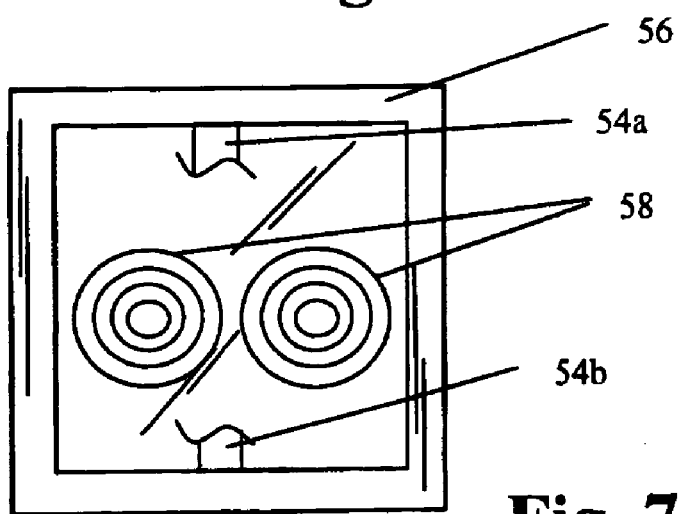
FIG. 7c is a somewhat diagrammatic plan view of the torsion oscillator of FIG. 1 with a plate 52 removed to reveal coils 58.

With reference to FIGS. 7a, 7b, and 7c, another embodiment of a torsion oscillator 64 is shown. In this embodiment, at least one magnet 66 is placed on the plate 52. At least one coil 58 is placed on the frame 56 in a corresponding position below or around plate 52. FIG. 7b depicts the positioning of magnet(s) 66 and coil(s) 58 in a cross sectional view of the torsion oscillator 64 taken along line 3-3 in FIG. 7a. FIG. 7c shows the plate 52 removed and extensions 54a and 64b broken away to reveal the coil(s) 58 adjacent the frame 56.

An alternating electrical drive signal, such as a square wave or a sine wave, is applied to the coil(s) 58 to produce an alternating electromagnetic field that interacts with the magnetic field of the magnets 66 and oscillates plate 52.

Figure 8A:
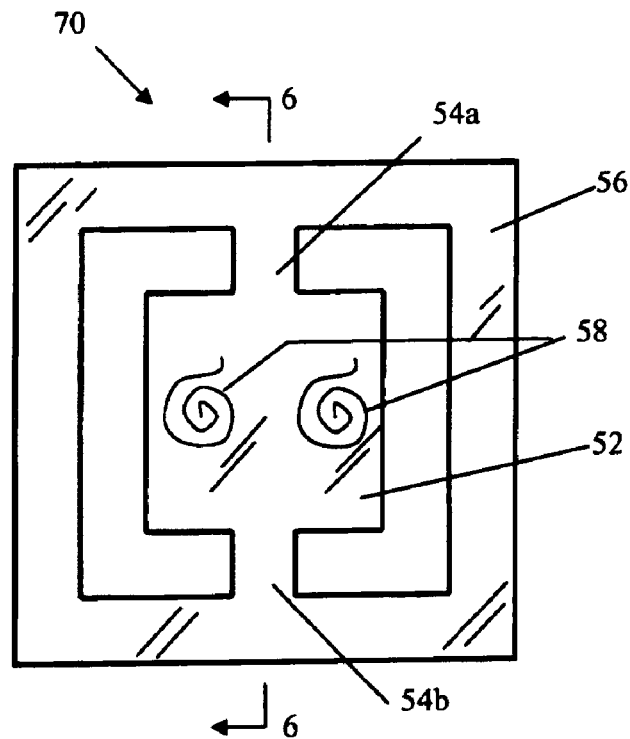
FIG. 8a is a somewhat diagrammatical plan view of another torsion oscillator that may be used in embodiments of the invention.
Figure 8B:
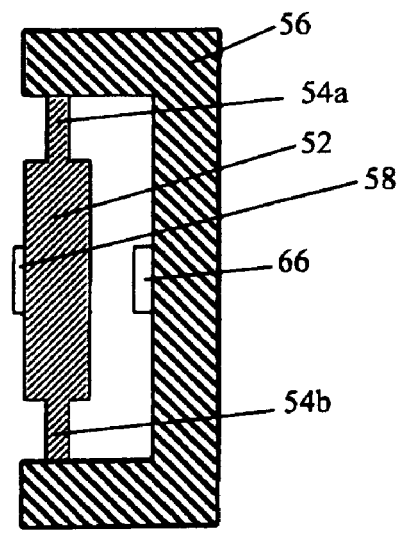
FIG. 8b is a cross sectional view of the torsion oscillator of FIG. 4 taken along section line 6-6 in FIG. 4.
Figure 8C:
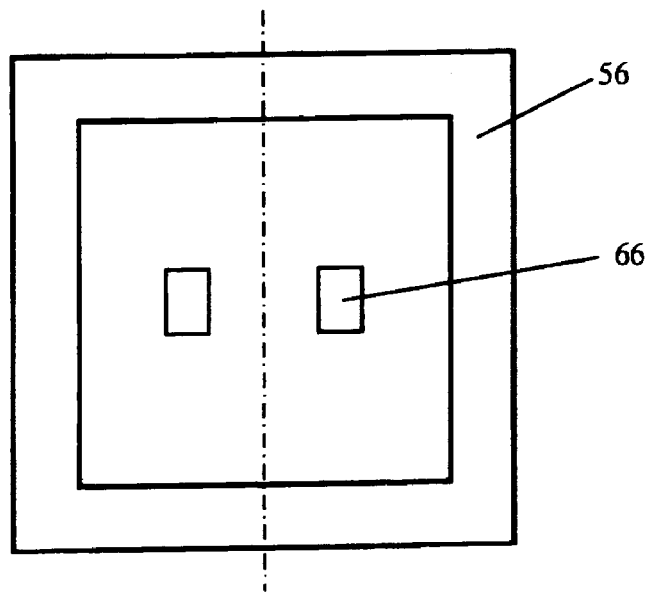
FIG. 8c is a view of the torsion oscillator of FIG. 5 with a plate 52 removed to reveal magnets 66.

Another torsion oscillator 70 that may be utilized in another embodiment of the invention is shown in FIGS. 8a, 8b, and 8c. FIG. 8a is a somewhat diagrammatic plan view that shows at least one coil 58 placed directly on the plate 52. FIG. 8b shows the placement of at least one magnet 66 on frame 56 in a position corresponding to the placement of the coil(s) 58 on plate 52. FIG. 8b is a cross sectional view of the oscillator 70 taken along line 6-6 in FIG. 4. FIG. 8c is a plan view of the torsion oscillator 70 with plate 52 removed and extensions 54a and 54b removed such that FIG. 6 depicts the placement of magnet(s) 66 adjacent the frame 56. As described above, the magnetic field of magnet(s) 66 and the alternating current in coil(s) 58 create a force that causes rotational oscillation of the plate 52 about extensions 54a, 54b with reverse inherent torsion. The alternating current in coils 58 will be produced by an electrical drive signal applied to the coils 58 at an electrical drive frequency. Typically, the torsion oscillator 70 will oscillate at a mechanical operating frequency that is the same as, or substantially the same as, the electrical drive frequency. There is always some phase shift between the mechanical operating frequency and the electrical drive frequency, the magnitude of which is governed by the resonant characteristics of the device being driven. Also, the mechanical operating frequency may be a harmonic of the electrical drive frequency in some applications, but preferably the mechanical operating frequency and the electrical drive frequency are the same.

Other means may be employed to make such a system oscillate, such as static electricity, piezoelectric forces, thermal forces, fluid forces or other external magnet fields or mechanical forces. The use of coil drive by electric current in the various embodiments should be considered illustrative and not limiting.

Referring back to the bi-directional laser printer embodiment in its entirety, the duration of a forward scan and reverse scan across the imaging window 6 are calculated ($t_{forward}$ and $t_{reverse}$ in FIG. 3), and the control logic 16 (FIG. 4) compares the two values to determine any difference between the two durations. Based on the difference, if any, the control logic 16, through a drive signal generator 42 (FIG. 1), sends one or more signals to the light beam driving mechanism 14, preferably a torsion oscillator 50, 64, or 70. More specifically, the drive signal generator 42 receives first and second control signals from the control logic 16 based on forward scan duration and reverse scan duration, respectively. The drive signal generator 42 then produces a first and second drive signal, whereby the first drive signal corresponds to forward light beam travel and the second drive signal corresponds to reverse light beam travel. The first and second drive signals, in turn, operate as first and second drive pulses, whereby the duration, magnitude, or both duration and magnitude of the pulses are altered according to differences in forward and reverse scan durations. The first and second drive signals are controlled to substantially eliminate any variation between forward scan duration and reverse scan duration.

By varying the duration of the forward or reverse drive pulse or pulses to the light beam driving mechanism 14 according to differences in forward and reverse scan durations across the imaging window 6, the goal of proper scan-to-scan alignment is accomplished. Alternatively, by varying the magnitude of the forward or reverse drive pulse or pulses to the light beam driving mechanism 14 according to differences in forward and reverse scan duration across the imaging window 6, the goal of proper scan-to-scan alignment is similarly accomplished.

Figure 9A:
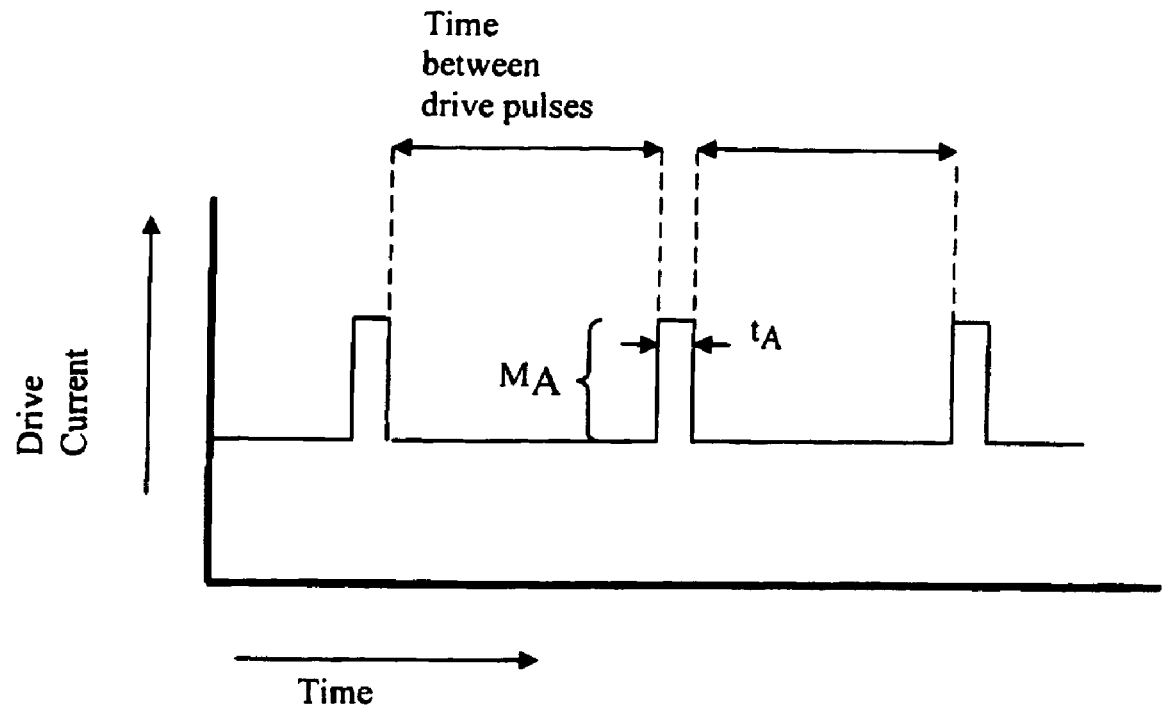
FIG. 9a is a graph illustrating the duration (X axis) and magnitude (Y axis) of typical drive pulses to a driving mechanism.
Figure 9B:
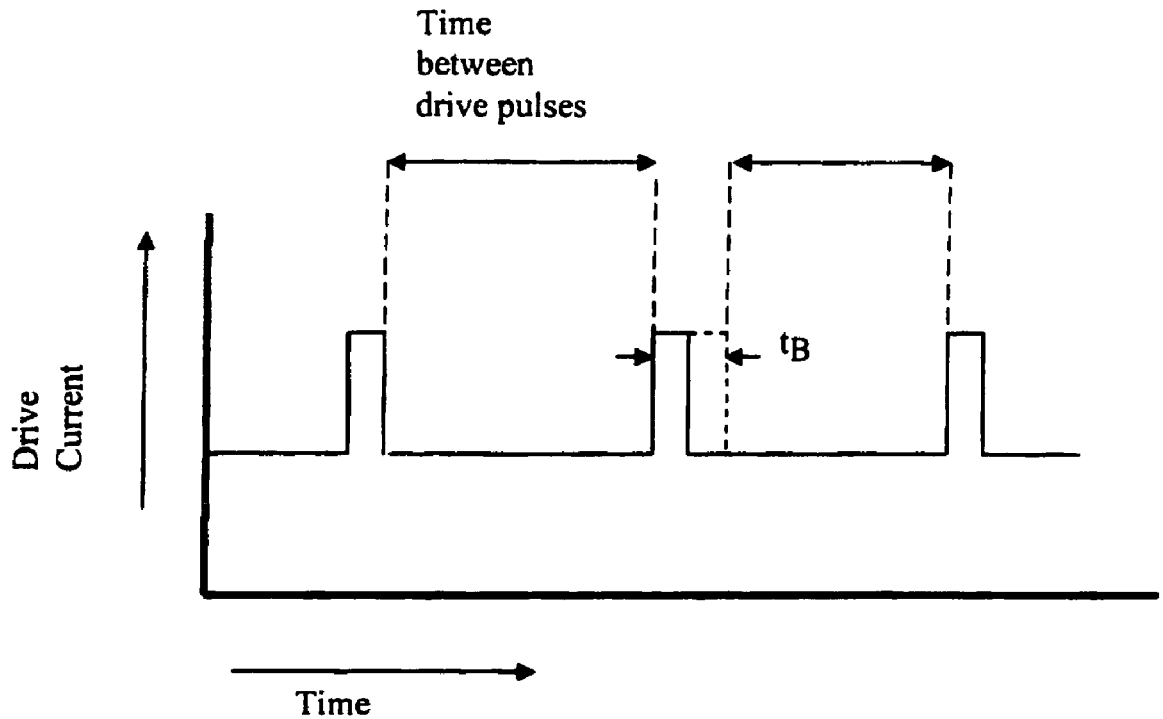
FIG. 9b is a graph illustrating an extended drive pulse to a driving mechanism.
Figure 9C:
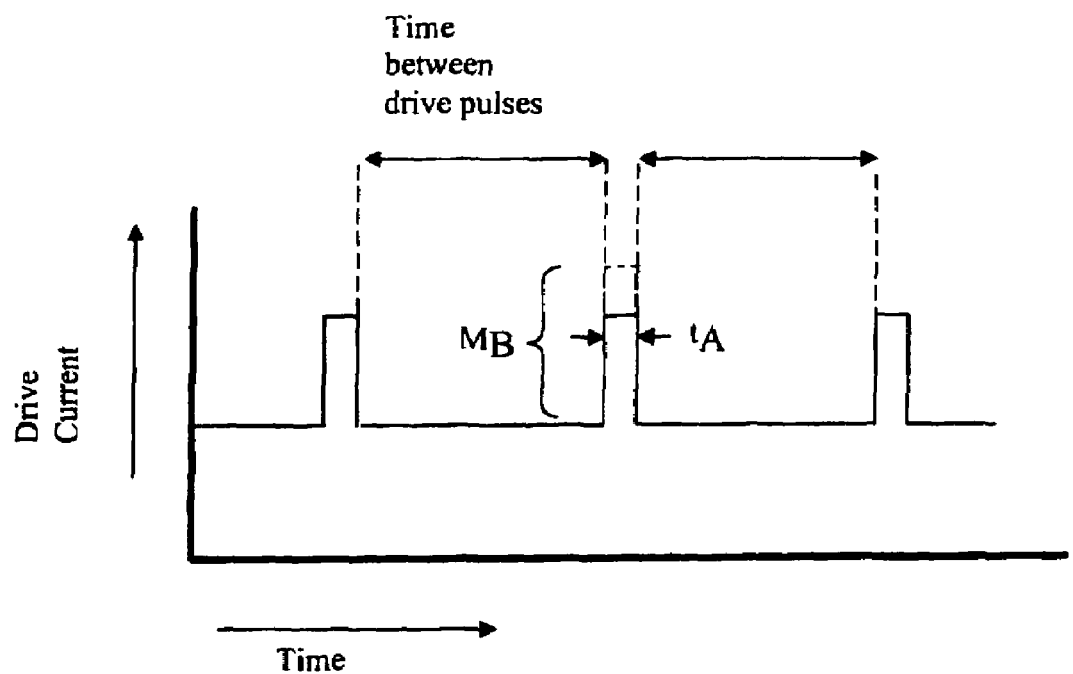
FIG. 9c is a graph illustrating a drive pulse with an increased magnitude sent to a driving mechanism.

As shown in FIG. 9a, the drive pulses to the driving mechanism 14 have a magnitude $M_A$ and time duration $t_A$. If, however, the duration of forward scans and reverse scans across the imaging window 6 begin to differ, the control logic 16 recognizes this difference and compels the drive signal generator 42 (FIG. 1) to vary the drive signals to the driving mechanism 14 so that the difference in scan durations between forward and reverse scans can be substantially eliminated. FIG. 9b demonstrates an embodiment in which the drive signal generator 42 has altered the duration of the drive pulse for either the forward or reverse direction in order to reconcile any detected difference in forward scan duration and reverse scan duration. The drive pulse duration, $t_B$ is longer, driving the drive mechanism 14 faster in the applicable direction. FIG. 9c demonstrates a similar embodiment in which the drive signal generator 42 has altered the magnitude of the drive pulse for either the forward or reverse direction in order to reconcile any detected difference in forward scan duration and reverse scan duration. The enhanced magnitude of the drive signal in FIG. 9c is shown as $M_B$, a value greater than the magnitude $M_A$ shown in FIGS. 9a and 9b. In FIG. 9c, the parameter of the drive signal being changed is the signal involving drive current. However, in this embodiment, the particular altered drive pulse is not limited to drive current. The altered pulse may include drive voltage, drive power, or any other related form of drive force to cause the driving mechanism 14 to move.

In a similar embodiment to the drive pulse varying method described above, the method of scanning a light beam 12 across an imaging window 6 is again employed as shown in FIG. 1. The durations of forward and reverse scans are also determined. Unlike the previous preferred embodiment, however, the drive signals are not altered. Instead, an incoming image signal is rasterized at a rate that is inversely proportional to the scan duration. Thus, for a longer scan duration, the rasterization rate is slower and the light beam 12 is modulated at a slower rate. Thus, the data (pixels) made by the modulated light beam 12 are in substantially the same positions on the image window for long or short scan durations, which correspond to slow or fast scan speeds.

Figure 10:
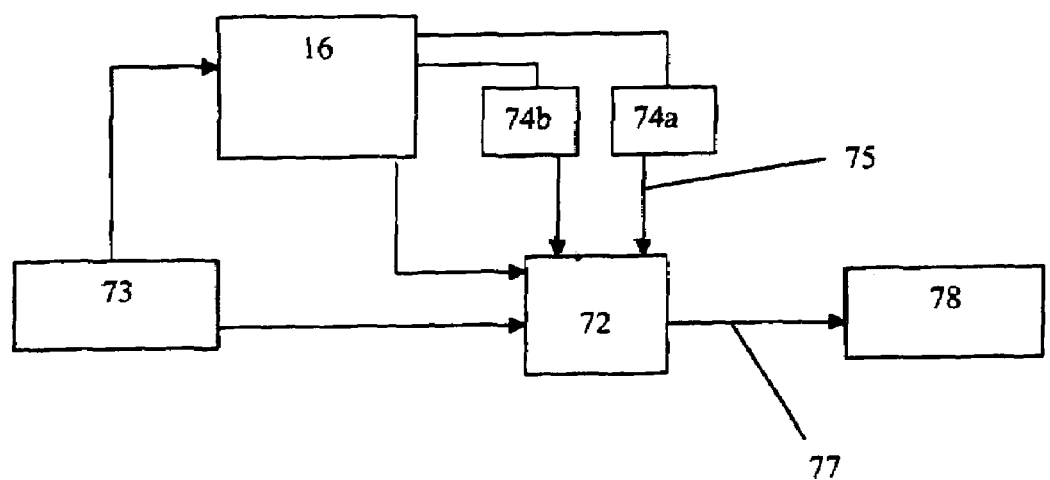
FIG. 10 is a block diagram illustrating connections to a single logic block representing one embodiment of the invention.

In the first of these embodiments as illustrated by FIG. 10, the control logic 16 operates on an image signal 73 (also called video feed data) through an image rasterization logic block 72. The image rasterization logic block 72, internally containing or connecting to two or more clocks or timing devices 74a and 74b, rasterizes the image signal 73 before it is used to modulate the light beam 12. The image rasterization logic block 72 essentially acts as a switch, connecting to one particular clock at a particular time. The rates of the clocks 74 are determined by the control logic 16 according to the forward and reverse scan durations. Typically, two clocks 74 are used, the first clock 74a corresponding to light beam 12 travel in the forward direction and the second clock 74b corresponding to light beam 12 travel in the reverse direction. When a particular rate is calculated, the logic block 72 sets the rate of a selected timing device 74a or 74b and switches to the selected timing device 74a or 74b corresponding to the direction of light beam 12 travel.

For example, when a clock 74a is selected during forward light beam 12 travel, clock 74a sends a clock signal 75 containing a specific clock frequency to the image rasterization logic block 72. The image rasterization logic block 72 then sends a rasterized signal 77 to the modulator 78. The modulator 78 modulates the light beam based on the incoming rasterized signal 77, and proper scan-to-scan alignment is substantially achieved by independently controlling the frequencies of the two clocks 74a and 74b based on the forward and reverse scan durations. Stated another way, if the scan durations are different, then one scan speed is greater that the other and the clock frequency associated with the faster scan direction is set at a greater frequency than the other clock frequency so that the light beam 12 is modulated more rapidly during the more speedy scan to image data more rapidly, but each dot remains in the same position along a horizontal line and scan-to-scan alignment of data is maintained.

Figure 11:
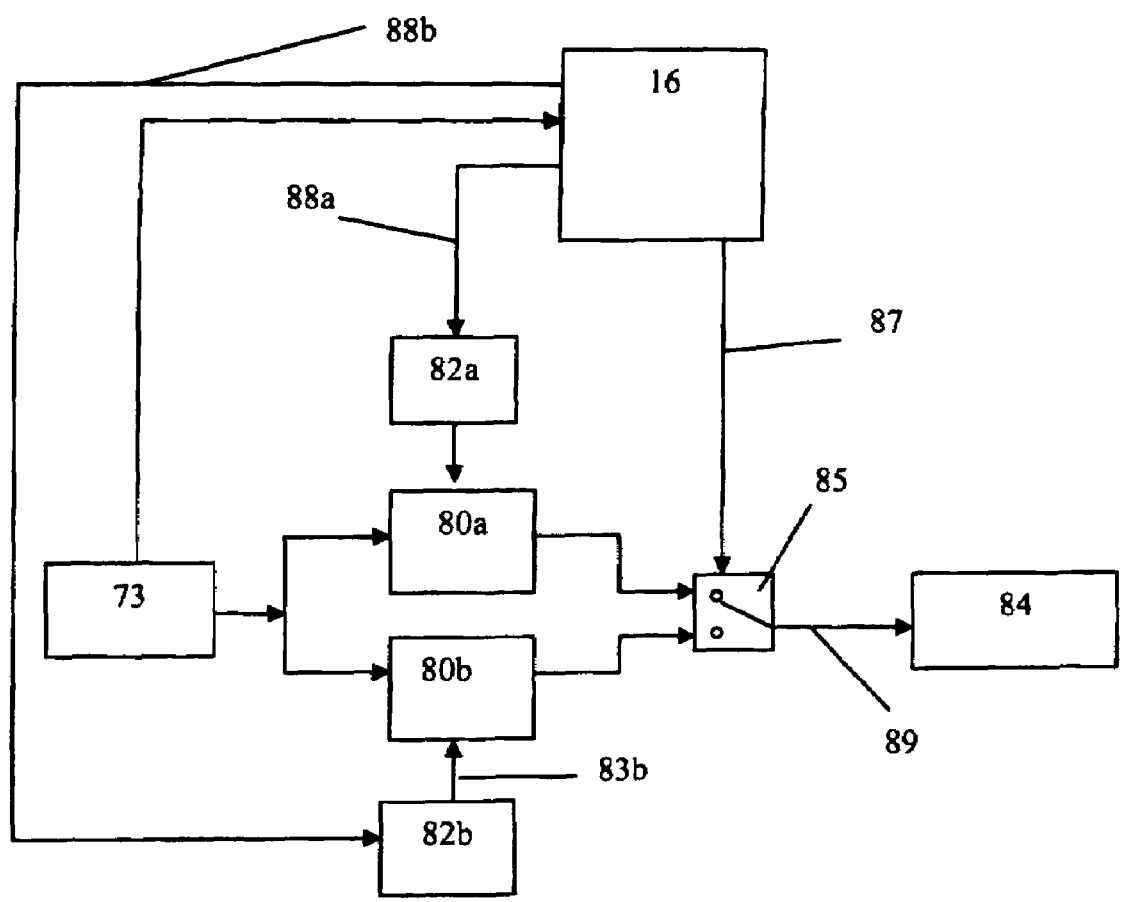
FIG. 11 is a block diagram illustrating connections to more than one logic block representing one embodiment of this invention.

The second of these embodiments, illustrated in FIG. 11, includes sending the incoming image signal 73 to each of a plurality image rasterization logic sub-blocks 80a and 80b, each image rasterization logic sub-block 80 connecting to an individual clock or timing device 82a and 82b. The clocks 82a and 82b each send clock signals 83a and 83b with specific clock frequencies to the rasterization logic sub-blocks 80a and 80b, respectively. Like the previous embodiment, the control logic 16 determines the scan durations of forward and reverse scans and sets each timing device 82a and 82b to correspond with the forward and reverse scan durations. In this embodiment, the control logic 16 controls switch 85 by sending a switch control signal 87 to alternately connect logic blocks 80a and 80b to the modulator 84. The modulator 84 receives the rasterized signal 89 from image rasterization logic sub-block 80a during light beam 12 travel in the forward direction and from image rasterization logic sub-block 80b during light beam 12 travel in the reverse direction. As in the prior embodiment, proper scan-to-scan alignment is achieved by independently controlling the frequency of the two clocks 82a and 82b.

Bi-directional Printing

Figure 14:
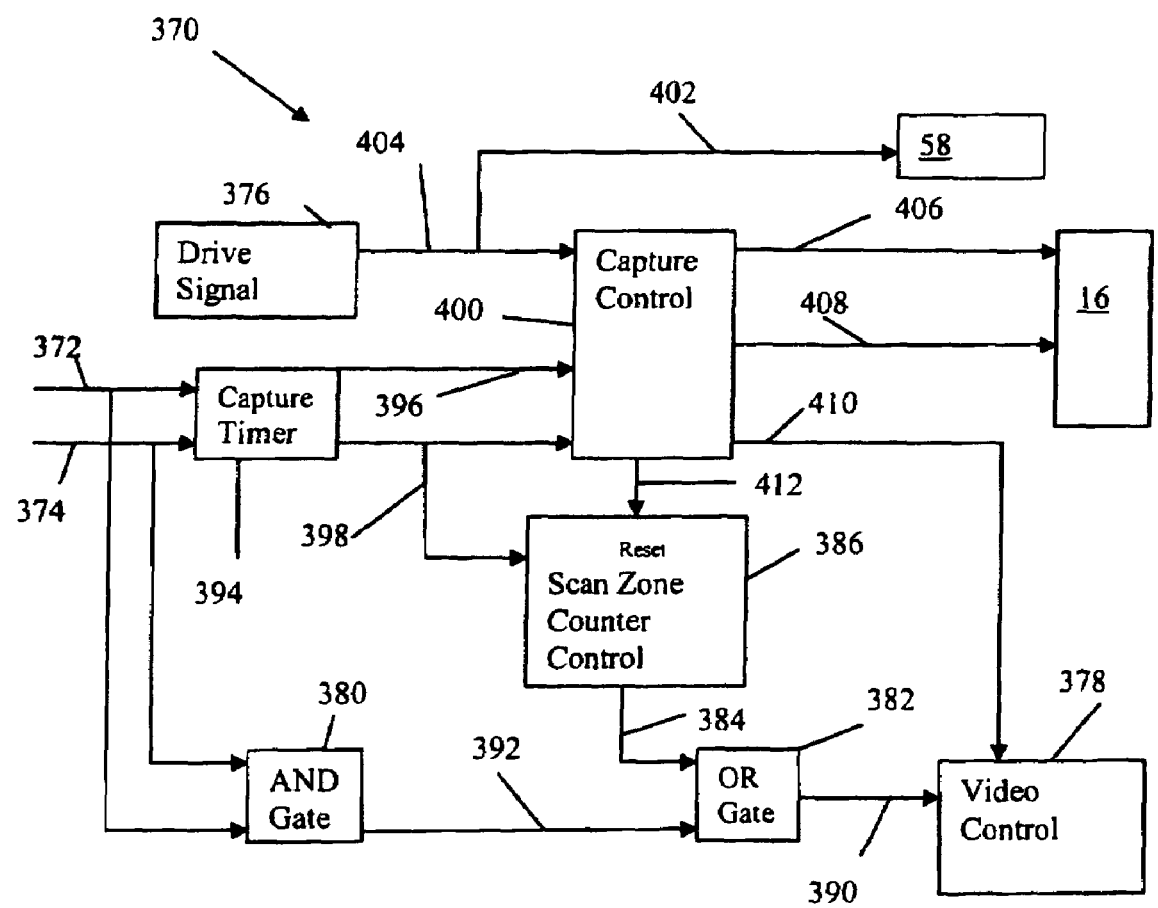
FIG. 14 is a block diagram of a control system for a bi-directional scanning system.

The scanning system of the present invention, such as shown in FIGS. 1 or 14 for example, is used in a bi-directional mode of operation. That is, the light beam is turned on and functions in both directions as it moves through a scan path. The bi-directional mode of operation is best understood by reference to FIGS. 2 and 13 which graph scan angle (or scan position) versus time for a scanning a laser beam such as beam 40 (FIG. 5). Since the motion of the beam 40 and the oscillator 50 can be proportional, these Figures may represent the motion of either or both.

FIG. 13 shows a sine wave representing oscillation of either light beam 40 or oscillator 50. FIG. 5 is a schematic representation of a light beam 40 sweeping through a scan across sensors A and B. FIG. 3 is a timing of diagram showing the time relationship between sensor feedback signals and signals indicating beam travel. In these figures, t-forward represents the forward print zones of the scanning laser beam 40 and t-reverse represents the reverse scan of the beam 40. The reverse operation that occurs during t-reverse is similar to the forward operation, except the data is reversed. For example, in a printing operation, the last pel is printed first and the first pel is printed last as the laser beam 40 scans in the reverse direction.

Referring to FIGS. 2, 3 and 13 simultaneously, for bidirectional printing, the light beam travels across sensor A moving to the left until it reaches the leftmost scan endpoint. Light beam 40 then travels from left to right and crosses sensor A at position a shown on FIG. 13, which creates a sensor pulse. The light beam 40 then travels a short distance and reaches the beginning of the forward print zone. The time required to cross the forward print zone is designated as t-forward. Light beam 40 then leaves the forward print zone and after a short distance, it crosses sensor B at position b shown on FIG. 13 and it continues its left to right travel until light beam 40 reaches its rightmost position. The light beam 40 then reverses its travel and moves right to left crossing sensor B again and then crossing the reverse print zone during the time period, t-reverse. The light beam 40 then reaches sensor A and the cycle repeats. As the light beam 40 crosses the forward and reverse print zones, it images or prints.

During a laser scan, preferably the time periods represented by the substantially linear regions (t-forward and t-reverse) are used for printing in the preferred embodiment resulting in less than half of the scan period (the time to complete one full laser scan) being used for printing. In other embodiments, t-forward and t-reverse may encompass times during which the curve 350 (FIG. 13) is not substantially linear. In such embodiment, a lens such as lens 150 (FIG. 4), may be used to create a substantially constant scan speed of laser beam 40 across a drum 96, for example. Using both the substantially linear and the non-linear portions of curve 350 allows greater scan efficiency, but the lens 150 becomes more difficult to design and more expensive. Even embodiments using a substantially linear portion of curve 350, a lens 150 may be used to correct for even slight non-linear sections and thereby create a constant speed scan of beam 40, but such lens is typically less difficult to design and less expensive.

The scan efficiency, η, is defined as the ratio of the usable print time (t-print) to the total scan time (t-scan). For imaging in only one scan direction of the light beam, the total usable print time will equal the forward print time (t-print=t-forward), and the scan efficiency, η, is approximately 25%. The scan efficiency of a rotating polygon mirror is typically in the range of 65%-75%. Since the scan efficiency of a galvo scanning system 154 (FIG. 4) during unidirectional printing is typically lower than the scan efficiency of a rotating polygon mirror, higher scan speeds and frequencies typically are required for the galvo scanner system 154 to achieve the same print speed in PPM as the rotating polygon mirror.

A galvo scanning system also typically requires a higher image signal rate (approximately 3 times greater than a rotating polygon mirror) because a shorter window of time is available during each scan to write the latent image at the same number of scans per second. By printing in both scan directions, the usable print time per scan is approximately doubled resulting in an increase in the scan efficiency to approximately 50% in a typical embodiment and a reduction in the data rate requirements is achieved. Additionally, image control, or gray scale implementation, requires multiple slices per PEL which increases the required video data rate. Bi-directional printing reduces the required video data rate and doubles the image control capability as compared to a system utilizing uni-directional printing.

FIG. 14 depicts a block diagram of the control logic 370 for bi-directional printing. The control logic 370 receives signals from sensors A and B and from a drive signal generator 376 and provides signals to Video Control 378 to control the timing of an imaging or printing function. In a preferred embodiment, the control logic 370 is included in control logic 16 and both may be implemented by a single microprocessor, although separate logic may also be employed. Also, in the preferred embodiment active low logic is used, meaning the occurrence of an event is signified by a signal going low, typically near zero. A sensor output on line 372, the horizontal synchronizing signal, HYSNC 1 from sensor A, and a sensor output on 374, HYSNC 2, a second horizontal synchronizing signal from sensor B, are combined in AND gate 380 to form the sensor feedback signal 360, also shown in FIG. 3. The sensor feedback signal 360 from the AND gate 380 is sent on line 392 into an OR gate 382 along with a SZCC signal on line 384 from a scan zone counter control (SZCC) circuit 386. The SZCC output signal on line 384 equals V-reference when the next sensor pulse should not trigger a scan. For instance, referring to FIG. 4, when the reflected light beam 40 is traveling from sensor B2 to sensor A2, the next sensor pulse will occur when the reflected light beam 40 crosses sensor A2. This sensor pulse should not trigger the reflected light beam 40 to scan the print data (such as from the RIP buffer shown in 388 FIG. 32) because the reflected light beam 40 is traveling toward endpoint c and is not within the linear print zone, t-forward. When the SZCC output signal on line 384 is V-reference, the output 390 of the OR gate 382 is also V-reference even when the next sensor pulse arrives on line 392. Thus, as the next sensor pulse sends the sensor feedback signal on line 392, the SZCC output signal 384 stays at V-reference and the resulting output 390 from the OR gate 382 also remains at V-reference.

The SZCC output signal 384 is driven low (near zero volts) when the next sensor pulse is received to thereby to scan the print data from the RIP buffer 388. To continue the example from above, as the reflected light beam 40 travels from sensor A at location a to the scan endpoint c and reverses scan direction back toward sensor A, the next sensor pulse (when the reflected light beam crosses sensor A) should trigger the reflected light beam 40 to scan the print data from the RIP buffer 388 because the reflected light beam 40 is about to enter the forward print zone represented by the time period t-forward. The next sensor pulse from the sensor feedback signal on line 392 will be near zero volts and the SZCC output signal 384 will be low, and the output 390 of the OR gate 382 is then also low (near zero volts), which is a signal to begin imaging or printing.

The output 390 of the OR gate 382 is transmitted to a video control 378. Preferably, the video control 378 is active low logic so a falling edge is interpreted by the video control 378 as an HSYNC (horizontal synchronizing) signal. An HSYNC starts the data output from the RIP buffer 388 after an appropriate time delay equal to the time, for example, from the beginning of the t1 zone to the start of the t-forward zone (referred to as t-delay forward). Similarly, the time delay in the reverse direction may equal the time difference between the beginning of the t3 zone and the start of the t-reverse zone (t-delay reverse). It is also understood that t-delay forward and t-delay reverse may comprise values which result in the print data being written from the RIP buffer 388 at various times after the reflected light beam 40 enters into either time period t-forward or t-reverse. Thus, t-delay forward and t-delay reverse may be used to achieve various desired print characteristics such as margin control. To successfully align the margins for each scan direction in bi-directional printing, t-delay forward for scanning and writing the print data in the forward direction can be set to a different value than t-delay reverse for scanning and writing the print data in the reverse direction. Varying t-delay forward from t-delay reverse also corrects for difference in offset, or other lack of symmetry in the torsion oscillator scan shape.

Figure 15:
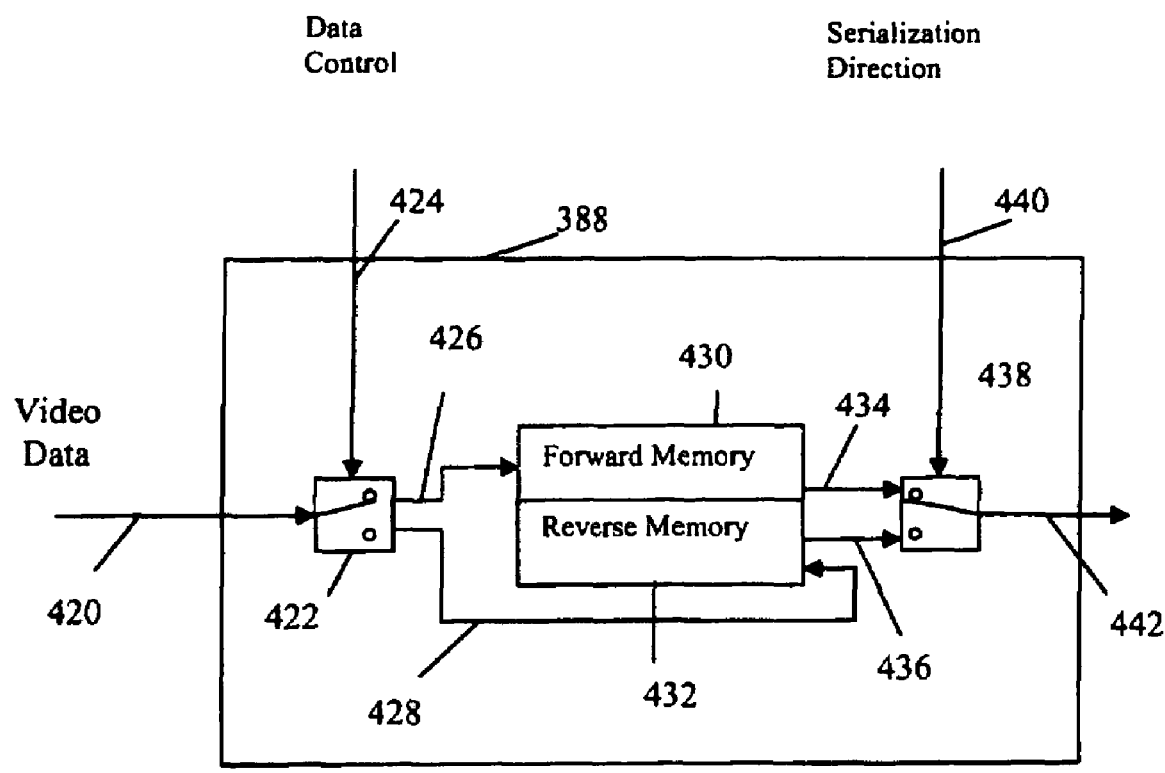
FIG. 15 is a schematic drawing of a preferred RIP buffer.

Referring to FIG. 15, one form of a RIP buffer 388 is schematically shown. Preferably the RIP buffer 388 is part of the video control 378. An image signal (video data) is introduced on line 420 and is received by a switch 422 within the buffer 388. The switch 422 is controlled by a data control signal received on line 424 and is produced by the video control 378. When the forward video data is being received, the switch 422 directs the data through line 426 and when reverse video data is received, the switch 422 directs the video data through line 428. Forward memory 430 is connected to line 426 to receive the forward video data and a reverse memory 432 is connected to reverse memory line 428 to receive the reverse video data. In FIG. 15, line 428 is shown connected to the opposite end of the memory 432 as compared to memory 430 and line 426. This feature graphically illustrates that reverse video data is stored in the reverse memory 432 in a reverse order as compared to data in memory 430. Data is read from the memories 430 and 432 through lines 434 and 436 under the control of switch 438. A serialization direction signal is supplied on line 440 to actuate the switch 438, which causes the buffer 388 to write either the forward video data or the reverse video data. When switch 438 is connected to line 434, the output signal on line 442 is the forward video data. Likewise, when switch 438 is connected to line 436, the reverse video data is written on line 442. Since the video data in the reverse memory 432 was stored in reverse order, it is written in reverse order on line 442 and is printed in reverse order during the reverse beam travel indicated by t-reverse. It should be understood that FIG. 15 is a somewhat schematic graphical representation of buffer 388 designed to illustrate the principles of this embodiment. The buffer 388 could be implemented differently in different embodiments. For example, buffer 388 could have one memory that is used serially to hold both forward and reverse data with the reverse data being written in reverse order. In another embodiment, one or two memories maybe used and the reverse data is stored in memory in the same order as the forward data, but it is retrieved from memory in a reverse order.

Referring again to FIG. 14, in an alternative embodiment, the input lines 372 and 374 (outputs of sensors A and B respectively) are connected together. The AND gate 380 is eliminated and one less input is required to a capture timer logic 394. This embodiment results in fewer conductors and lower cost cabling.

In another embodiment, one sensor comprises a mirror. Either sensor A or sensor B could comprise a mirror, but for purposes of illustration sensor B comprises the mirror. As the reflected light beam 40 passes over sensor B, the mirror reflects the light beam 40 to sensor A. The resulting output of sensor A is the same combined sensor feedback signal shown in FIG. 3 with the same information content. Again, the AND gate 394 is eliminated and the sensor cost is cut in half.

Still referring to FIG. 14, the inputs 372 and 374 (generated from any of the embodiments discussed above) are also fed into a capture timer logic 394. Capture timer logic 394 counts each of the time intervals t0, t1, t2, and t3 shown in FIGS. 3 and 13. When the reflected light beam 40 travels over sensor A or sensor B the capture timer logic 394 receives a falling edge, as shown in FIG. 3 and stops a time count in progress. Timer logic 394 then transmits the time count through capture timer output signal 396 and transmits a signal 398 indicating it is transmitting a new capture. Thus, each time the next sensor feedback pulse is received by capture timer logic 394, the new capture signal on line 398 is toggled.

In the preferred embodiment, the capture timer logic 394 does not recognize which time interval has been measured (either t0, t1, t2, or t3). As shown in FIG. 14, a capture control logic 400 receives the information content of a drive signal generator 376 through line 404. One function of capture control logic 400 is to generate a capture error signal on line 406 and capture time signals for each sensor interval signal on line 408. Although the signals on lines 406 and 408 are shown as transmitted to control logic 16 in FIG. 14, it is understood that all of the components of FIG. 14 may be contained within control logic 16 or may be external to control logic 16.

The capture control logic 400 also uses the information content of the drive signal 404 from the drive signal generator 376 to generate direction information needed for either bi-directional or uni-directional printing. The direction information (forward or reverse) is used to provide the SZCC output signal on line 384 (which synchronizes the output on line 390 of the OR gate 382 with the start of forward or reverse scan direction) and is used to generate a serialization direction signal on line 410 to transmit to the video control 378 for determining forward or reverse serialization direction from the RIP buffer 388.

In one embodiment, the drive signal generator 376 provides a square wave pulse signal on line 404 as shown in FIGS. 9a, b, and c to drive the current to the coils 58 of the torsion oscillator 50, 64 or 70. The capture control logic 400 detects a rising or falling edge of the square wave drive signal 404, whichever corresponds to the start of forward direction of travel of the torsion oscillator 50, 64 or 70, and generates a start forward travel signal on line 412 indicating start of forward beam travel also shown in FIG. 3. One may not assume that a rising edge of the drive signal 404 indicates that the oscillator 50, 64 or 70 is moving in the forward direction. However, by analyzing the time intervals themselves and using empirically determined relationships between the time intervals and the drive signal 404, the capture control logic may determine which pulse is the first pulse in the forward travel of the laser. The capture control logic 400 uses the same method as described above to determine the first sensor pulse occurring while the laser is moving in the forward direction.

The start forward travel signal on line 412 is sent to the SZCC 386 and is also used within the capture control logic 400 to reset a counter that counts new captures. The first and second new captures after the start of forward travel correspond to the forward direction part of the scan (as the reflected light beam passes over sensor A and sensor B as denoted by time period t1) and the third and fourth new captures correspond to the reverse direction of the scan (as the reflected light beam again passes over sensor B and then sensor A as denoted by time period t3).

For bi-directional printing, the serialization direction signal on line 410 is provided to the video control 378 to control the direction of data from the RIP buffer 388 (to ensure correct alignment of the print data). The serialization direction signal is set high for the first and second new captures (denoting forward beam travel) and is set low for the third and fourth new captures (signaling reverse beam travel).

In an alternative embodiment, the drive signal generator 376 generates the start of forward beam travel signal 412 as described in the embodiment above. Instead of counting new captures to toggle the serialization direction signal on line 410 to the video control 378, the drive-signal 404 can be buffered and sent either directly or as its logical inverse (depending upon the forward and reverse sign convention of the torsion oscillator 50, 64 or 70) as the serialization direction signal 410 to the video control 378.

In another embodiment, sensor A and sensor B generate separate HSYNCN1 and HSYNCN2 signals on lines 372 and 374 respectively and the capture control logic 400 determines the start of forward travel. For example, sensor A generates HYSNCN1 at the start of time periods t1 and t0 while sensor B generates HYSNCN2 at the start of time periods t2 and t3. With two sensors, control logic 400 can distinguish time intervals based on the arrival pattern of the HSYNC signals. Therefore, control logic 400 is always aware of the position of the light beam 40. The forward motion will begin approximately half way through the t0 time period, which begins at the first of two consecutive HSYNC1 pulses. Therefore, the capture control logic 400 can generate the start of forward beam travel signal 412 to be sent to SZCC 386. The serialization direction signal 410 provided to the video control 378 to control the direction of serialization of the data of RIP buffer 388 is generated in the same manner as discussed above.

Referring to FIG. 14, the start forward travel signal on line 412 and the new capture signal on line 398 are input into the scan zone counter control (SZCC) 386 to generate the SZCC output signal on line 384. The SZCC output signal 384 is based upon whether a bi-directional enable (BIDI-enable) signal on line 424 to SZCC 386 is high or low. When a start forward travel signal on line 412 is received by the SZCC 386, the SZCC 386 is reset and the SZCC output signal 384 is set to voltage low. At this time, the sensor feedback signal on line 392 is at V-reference, and the output signal 390 of the OR gate 382 remains at V-reference until the next sensor feedback signal on line 392 goes low and indicates a falling edge to the OR gate 382. When sensor feedback signal 392 indicates a falling edge (the reflected light beam 40 passes a sensor and generates a falling voltage signal), the suppress HSYNC signal on line 384 is still low and the low signal on line 392 is allowed to pass through the OR gate 382 to become the output signal on line 390 (low) which is transmitted to the video control 378 indicating that the reflected light beam 40 should write the print data from the RIP buffer 388 after t-delay forward. This signals the start of the time interval t1 that is the desired zone for forward printing. The SZCC 386 then counts new capture toggles through new capture signal on line 398, and the SZCC output signal on line 384 is reset to V-reference to ensure that the sensor feedback signal 392 at the end of the t1 interval (which would be low because the reflected light beam passed sensor B) is not passed through as the output signal on line 390 of the OR gate 382 and is not passed to the video control 378.

If the bi-directional enable logic line 424 is high, after the second new capture pulse is received by the SZCC 386, the SZCC output signal on line 384 is set to voltage low. As the reflected light beam passes sensor B at the start of interval t3 during reverse beam travel, the next sensor feedback signal 392 indicating a falling edge arrives at the OR gate 382 and is allowed to pass through as the output signal on line 390 of the OR gate 382 and is allowed to pass to the video control 378. This signals the start of the time interval t3 and indicates that the reflected light beam 40 should write the print data from the RIP buffer 388 in the reverse scanning direction. Correct alignment of the data in reverse order is assured through the serialization direction signal 410.

If the bi-directional enable logic line 424 is low or high, when a start of forward beam travel signal 412 is received by the SZCC 386, the SZCC 386 is reset and the SZCC output signal on line 384 is set to voltage low. After the SZCC 386 is reset, when the first new capture pulse is received by the SZCC 386, the SZCC output signal 384 is set to V-reference as in the case of bi-directional printing described above, but the SZCC output signal remains at V-reference through the reverse travel region. Therefore, only the first sensor feedback signal on line 392 indicating a falling edge that arrives at the OR gate 382 is allowed to pass through as the output signal on line 390 of the OR gate 382 to the video control 378. This signals the start of the time interval t1 that is the desired zone for forward printing only.

The foregoing description of preferred embodiments has been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A bi-directional imaging apparatus comprising:
    a light source for generating a light beam;
    a scanner for scanning the light beam through a scan path in a forward direction for a forward scan duration and a reverse direction for a reverse scan duration;
    first and second sensors disposed in the scan path for sensing the light beam as it scans across the sensors to produce first and second sensor signals corresponding respectively to the light beam scanning across the first and second sensors;
    control logic for receiving the first and second sensor signals and determining first and second scan durations based on the first and second sensor signals, and producing first and second control signals corresponding to the first and second scan durations, wherein scan duration is a time period corresponding to the first and second sensor signals;
    a drive signal generator for receiving the first and second control signals, producing first and second drive signals and sending the first and second drive signals to the scanner to substantially equalize the forward scan duration with the reverse scan duration.

2. The apparatus of claim 1, further comprising an imaging window within the scan path, the first and second sensors located adjacent to the imaging window, wherein forward scan duration is defined as the time required for a scan to cross the imaging window in a forward direction and reverse scan duration is defined as the time required for a scan to cross the imaging window in a reverse direction and wherein the control logic determines the forward and reverse scan durations based on the sensor signals.

3. The apparatus of claim 2, wherein the first scan duration and second scan duration comprise forward scan duration and reverse scan duration, respectively.

4. The apparatus of claim 1, wherein the drive signal is selected from the group consisting of drive current, drive voltage, and drive power.

5. The apparatus of claim 1, wherein the light beam comprises a laser.

6. The apparatus of claim 1, wherein the scanner comprises a torsion oscillator.

7. A method for bi-directional imaging comprising:
    providing a light beam;
    scanning the light beam through a scan path in a forward direction and a reverse direction;
    sensing the position of the light beam and generating first and second position signals corresponding to first and second positions in the scan path;
    determining first and second scan durations based on the first and second position signals, the first and second scan durations being time periods corresponding to the first and second sensor position signals, respectively;
    producing first and second control signals corresponding to the first and second scan durations;
    generating first and second drive signals from the first and second control signals;

driving, based on the fist and second control signals, the light beam in the forward direction with a forward drive force and in the reverse direction with a reverse drive force to produce the scanning of the light beam;

adjusting the forward and reverse drive forces based on the first and second scan durations to substantially equalize the first and second scan durations.

8. The method of claim 7, wherein the drive signal is selected from a group consisting of drive current, drive voltage, and drive power.

9. The method of claim 7, wherein the light beam comprises a laser.

10. The method of claim 7, wherein the light beam is oscillated by a torsion oscillator.

11. The method of claim 7, wherein the first and second scan durations comprise a time for the scan to cross an imaging window in forward and reverse directions, respectively.

12. A bi-directional imaging apparatus for operating on an incoming image signal comprising:

a light source for generating a light beam;

a scanner for scanning the light beam through a scan path in a forward direction and a reverse direction;

first and second sensors disposed in the scan path for sensing the light beam as it scans across the sensors to produce first and second sensor signals corresponding respectively to the light beam scanning across the first and second sensors;

control logic for receiving the first and second sensor signals and determining first and second rasterization rates based on the first and second sensor signals, and producing first and second control signals corresponding to the first and second rasterization rates;

first and second clocks for producing first and second clock signals having first and second frequencies, respectively, corresponding to the first and second control signals, respectively;

an image rasterization logic block receiving the first and second clock signals and the incoming image signal and for rasterizing the incoming image signal based on the first and second clock signals to produce a rasterized signal, a modulator receiving the rasterized signal and modulating the light beam based on the rasterized signal.

13. The apparatus of claim 12, wherein the image rasterization logic block further comprises:

first and second image rasterization logic sub-blocks, the first image rasterization logic sub-block rasterizing the incoming image signal based on the first clock signal and the second image rasterization logic sub-block rasterizing the incoming image signal based on the second clock signal, the first and second image rasterization logic sub-blocks producing first and second rasterized pre-signals, respectively;

a switch receiving the first rasterized pre-signal, second rasterized pre-signal, and a switch control signal, selecting the first or second rasterized image pre-signal based on the switch control signal, and producing the rasterized signal.

14. The apparatus of claim 12, further comprising an imaging window within the scan path, the first and second sensors located adjacent to the imaging window, wherein forward scan duration is defined as the time required for a scan to cross the imaging window in a forward direction and reverse scan duration is defined as the time required for a scan to cross the imaging window in a reverse direction and wherein the control logic determines the forward and reverse scan durations based on the sensor signals.

15. The apparatus of claim 12, wherein the light beam comprises a laser.

16. The apparatus of claim 12, wherein the scanner comprises a torsion oscillator.

17. A method for bi-directional imaging based on an incoming image signal comprising:

providing a light beam;

scanning the light beam through a scan path in a forward direction and a reverse direction;

sensing the position of the light beam and generating first and second position signals corresponding to first and second positions in the scan path;

determining first and second rasterization rates based the first and second position signals;

producing a rasterized signal based on the first and second rasterization rates, the first and second position signals and the incoming image signal; and modulating the light beam based on the rasterized signal, whereby the first and second rasterization rates compensate for differences in the durations of scans in the forward and reverse directions to provide scan to scan alignment of the modulation of the light beam.

18. The method of claim 17, further comprising:

producing first and second rasterized presignals based on the first and second rasterization rates, respectively;

producing the rasterized signal based on the first and second rasterized presignals.

19. The method of claim 18, wherein the rasterized signal is produced by selecting one of the rasterized presignals to be the rasterized signal.

20. The method of claim 19, wherein the rasterized signal is produced by selecting the first rasterized presignal to be the rasterized signal when the light beam is scanned in the forward direction and by selecting the second rasterized presignal to be the rasterized signal when the light beam is scanned in the reverse direction.

21. The method of claim 17, whereby the modulation step comprises turning the light beam on and off based on the image feed signal.

22. The method of claim 17, wherein the light beam comprises a laser.

* * * * *